United States Patent
Ting et al.

(10) Patent No.: US 10,528,629 B2
(45) Date of Patent: Jan. 7, 2020

(54) SYSTEMS AND METHODS FOR PROVIDING SYNDICATED CONTENT

(75) Inventors: Chyr-Chong Joseph Ting, San Jose, CA (US); Adam Hyder, Los Altos, CA (US)

(73) Assignee: OATH INC., New York, NY (US)

( * ) Notice: Subject to any disclaimer, the term of this patent is extended or adjusted under 35 U.S.C. 154(b) by 1837 days.

(21) Appl. No.: 11/696,143

(22) Filed: Apr. 3, 2007

(65) Prior Publication Data

US 2008/0250031 A1    Oct. 9, 2008

(51) Int. Cl.
   *G06F 16/95*     (2019.01)
   *G06F 16/9535*   (2019.01)
   *H04L 29/08*     (2006.01)

(52) U.S. Cl.
   CPC ......... *G06F 16/9535* (2019.01); *H04L 67/02* (2013.01)

(58) Field of Classification Search
   CPC .................................................. G06F 16/9535
   USPC .................. 707/722, 736; 709/223; 705/51
   See application file for complete search history.

(56) References Cited

U.S. PATENT DOCUMENTS

| | | | | |
|---|---|---|---|---|
| 6,976,010 | B2 * | 12/2005 | Banerjee et al. | 705/51 |
| 7,433,876 | B2 * | 10/2008 | Spivack et al. | 707/999.1 |
| 2005/0010955 | A1 * | 1/2005 | Elia | G06F 3/0482 725/88 |
| 2005/0172009 | A1 * | 8/2005 | Roh | H04L 47/10 709/219 |
| 2005/0193010 | A1 * | 9/2005 | DeShan | G06Q 30/02 |
| 2006/0165379 | A1 * | 7/2006 | Agnihotri | G06F 17/30787 386/231 |
| 2006/0200445 | A1 * | 9/2006 | Chen et al. | 707/2 |
| 2006/0265489 | A1 * | 11/2006 | Moore | 709/223 |
| 2007/0038712 | A1 * | 2/2007 | Affronti et al. | 709/206 |
| 2007/0078904 | A1 | 4/2007 | Yoon et al. | |

FOREIGN PATENT DOCUMENTS

WO    WO 2007-007965    1/2007
WO    WO 2005-065237    8/2007

OTHER PUBLICATIONS

International Search Report (PCT/US2008/059000) dated Aug. 29, 2008.

* cited by examiner

*Primary Examiner* — Syling Yen
(74) *Attorney, Agent, or Firm* — James J. DeCarlo; Greenberg Traurig, LLP

(57) ABSTRACT

Methods and systems of providing syndicated feeds are disclosed. Content metadata is received from a feed provider. At least one rule for syndicating to a feed receiver a content item that corresponds to the content metadata is identified. A request from the feed receiver for syndication of the content item is received. The content item is requested for the feed provider. The content item received from the feed provider is syndicated in real-time to the feed receiver according to the at least one rule.

5 Claims, 12 Drawing Sheets

SYSTEMS AND METHODS FOR PROVIDING SYNDICATED CONTENT

BACKGROUND

1. Field

The present disclosure relates to syndicated content. In particular, it relates to systems and methods of providing arbitration services for syndicated content.

2. General Background

Web content syndication is becoming increasingly popular because it benefits both the syndication feed provider and the syndication feed receiver. Web syndication is the process of making web feeds available. Popular syndication formats include RSS and ATOM. The provider of web feeds benefits from creating additional exposure to its web content by making the content available on other web sites. The receiver benefits from getting more content. Certain websites are pure aggregators of web feeds and monetize on advertisements. In conventional syndication methods, there is no provision for regulating how the syndicated content is to be provided to the feed receiver, or utilized by the feed receiver.

SUMMARY

In one aspect, there is a method of providing syndicated feeds. Content metadata is received from a feed provider. At least one rule for syndicating to a feed receiver a content item that corresponds to the content metadata is identified. A request from the feed receiver for syndication of the content item is received. The content item requested is received from the feed provider. The content item received from the feed provider is syndicated in real-time to the feed receiver according to the at least one rule.

The at least one rule is identified upon receiving from the feed provider the at least one rule for syndicating the content item. In another aspect, the at least one rule is identified by an arbitration service that establishes the at least one rule.

The at least one rule can be indicative of whether the feed receiver is permitted to receive the content item. Furthermore, the at least one rule can be indicative of a time period when the content item is available for syndication. In addition, the at least one rule requires that only a portion of the content item be provided to the feed receiver.

In one aspect, the content metadata is a universal resource locator. In another aspect, content metadata is a decryption key.

In one aspect, the at least one rule is indicative of whether there is a fee associated with syndicating the content item to the feed receiver. In another aspect, the at least one rule is indicative of the speed of streaming data to the feed receiver. In yet another aspect, the at least one rule further applies to syndication of other content items.

In one aspect, the request is received directly at the feed receiver. In another aspect, the request is a redirected request received from the feed provider. Furthermore, the content item can be a digital video file, a digital music file, a web file, or the like.

In another aspect, there is a method of providing syndicated feeds. A content item is received from a feed provider. The content item is stored. At least one rule for providing the content item to a feed receiver is identified. A request from the feed receiver is received for the content item. It is determined, according to the at least one rule whether the content item is to be syndicated to the feed receiver. The content item is syndicated to the feed receiver if it is determined that the content item is to be provided to the feed receiver.

In another aspect, there is a system to provide syndicated feeds comprising a network server and an arbitration engine. The network server can be configured to receive content metadata from a feed provider. The network server can be configured to receive a request from the feed receiver for a content item that corresponds to the content metadata. The arbitration engine can identify one or more rules for providing to a feed receiver the content item. The arbitration engine can request the content item from the feed provider. The syndication module can relay in real-time to the feed receiver the content item received from the feed provider according to the one or more rules.

In another aspect, there is a method of arbitrating the transmission of content items. A request for a content item is received from a feed receiver. Content metadata is received from a feed provider. A content item corresponding the content metadata is received from a feed provider. The content item is syndicated to the feed receiver in a manner such that the rules previously received from the feed provider are enforced considering the content metadata.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

Various methods and systems for providing syndicated content are disclosed. A feed provider can be a business entity or any other entity that owns content to be syndicated to feed receivers. Feed receivers are users that subscribe to receive syndicated feeds of their preference. An arbitration service provider is disclosed. The arbitration service provider identifies syndication rules indicative of the manner in which content is to be syndicated to feed receivers. In one aspect, the syndication rules are established by a feed provider. Thus, the arbitration service provider identifies syndication rules using the syndication rules established by the feed provider. In another aspect, the syndication rules are established by the arbitration service provider. Thus, the arbitration service provider identifies syndication rules by creating such rules based on the type of content, target audiences, and any other indicators.

Syndication rules can indicate when content is to be syndicated, how content is to be syndicated, who are the permitted feed receivers of the syndicated content, what content is to be syndicated, where the content resides, where, how, and when the syndicated content can be displayed/used by the feed receiver, etc. The arbitration service provider syndicates the content items to the feed receiver according to the syndication rules. In one aspect, the arbitration service provider syndicates the content items in real-time. Thus, for example, a feed request is handled immediately and the content item being syndicated can be viewed, played or rendered by the feed receiver a portion of the content item is still being downloaded from the feed provider to the arbitration service provider.

Figure 1:
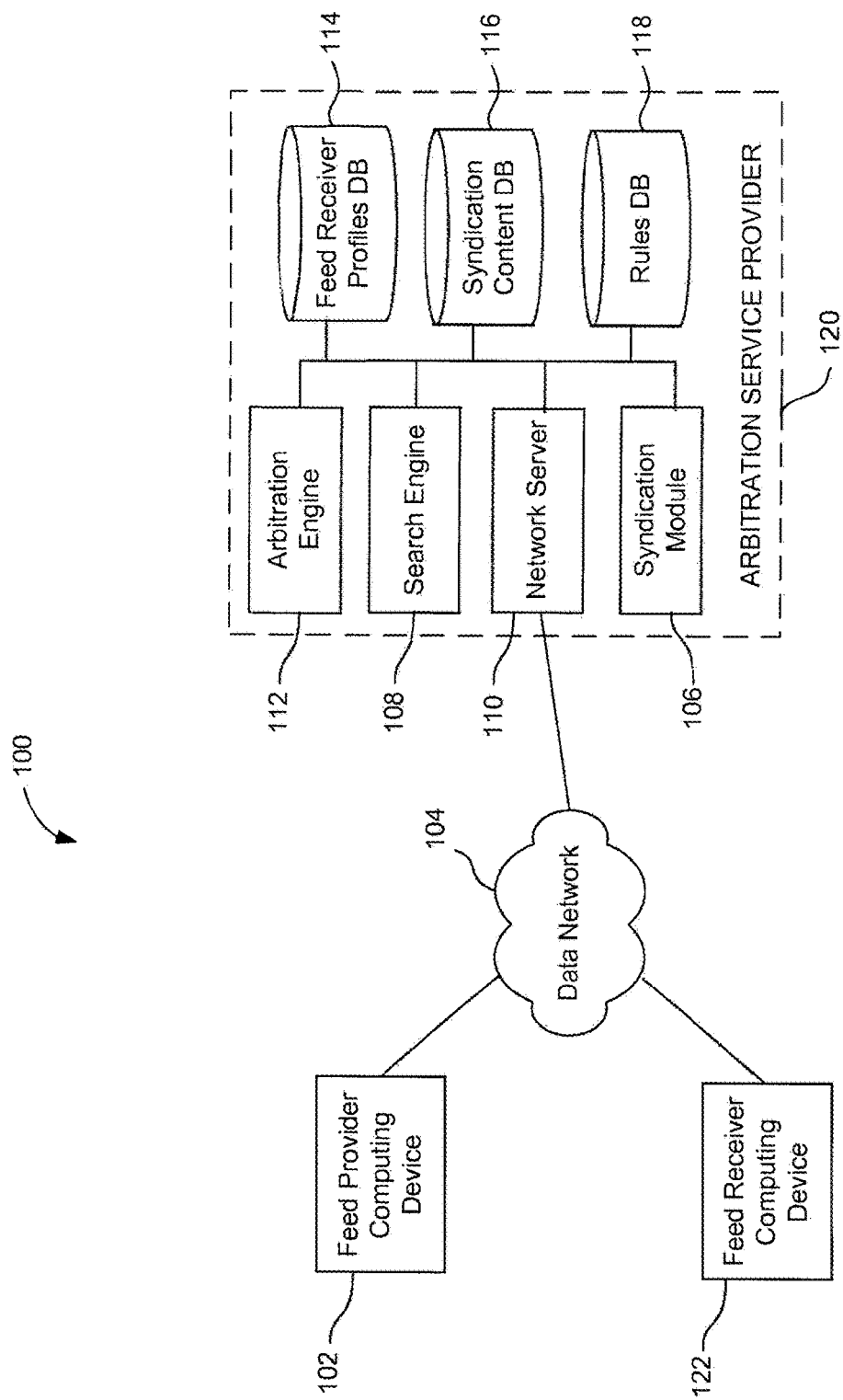
FIG. 1 depicts a component diagram of a system for providing syndicated content according to one embodiment.

FIG. 1 depicts a component diagram of a system for providing syndicated content according to one embodiment. In one embodiment, the arbitration service provider 120 can host one or more online services. As such, the arbitration service provider 120 can be a business entity that owns and operates a computer infrastructure connected to data network 104 in order to provide a plurality of syndication services that can be accessed by feed providers and feed receivers. Feed providers and feed receivers can communicate, via a data network 104, with the arbitration service provider 120. In one embodiment, the data network 104 is the Internet. In another embodiment, the data network 104 is an intranet, a LAN, a WAN, or any other computer network.

A feed provider can utilize a feed provider computing device 102 to interact with one or more computing modules and/or services that are part of the computer infrastructure of the arbitration service provider 120. Likewise, the feed receiver can utilize a feed receiver computing device 122 to communicate via the data network 104 with modules and services managed by the arbitration service provider 120. The arbitration service provider 120 serves as a third party arbitrator that helps to filter syndicated content to the feed receiver. The feed provider can be an entity that provides syndicated feeds of content items in which feed receivers have expressed an interest. Instead of directly submitting syndicated feeds to the feed receiver computing device 122, the feed provider can submit syndicated feeds to the arbitration service provider 120. The arbitration service provider 120 can then transmit the syndicated feeds to the appropriate feed receiver according to pre-established syndication rules. In one example, the feed provider submit the syndication rules that are indicative of how the syndicated data provided by the feed provider is to be transmitted and distributed to various feed receivers. Based on such rules the arbitration service provider 120 can filter the content data provided to various feed receivers. Furthermore the arbitration service provider 120 can also establish rules to provide the syndicated feeds to the feed receiver.

In one embodiment, the feed provider computing device can be configured with a web browser that allows the feed provider computing device to send data to and receive data from a network server 110. The feed provider computing device 102 communicates with the network server 110 to render web pages received from the network server 110 as well as to transmit feed provider input to the network server 110. In another embodiment, the feed provider computing device 102 can communicate through the data network 104 via any client-side application configured to communicate in a predetermined protocol with the network server 110. In the same manner, the arbitration service provider 120 can be accessed by a feed receiver computing device 122 to request one or more syndicated content data feeds. In one embodiment, the feed receiver computing device 122 can be configured with a web browser that allows the feed receiver computing device 122 to transmit and receive data from the network server 110.

In one embodiment, the network server 110 can be configured to receive content metadata from the feed provider. The network server 110 can further be configured to store the content metadata in a content database 116. Content metadata can include address or URL of the content item, decryption key, format of the content item, general information related to the content item, keywords, etc.

Moreover, the network server 110 can be configured to receive content items from the feed provider. The network server 110 can further be configured to store the content items received from the feed provider in the content database 116. The feed provider can upload, via a web form provided by arbitration service 120, the content item to be syndicated to one or more feed receivers. In another embodiment, the feed provider can provide a link, a URL, or any other referencing pointer indicative of a network address wherein the content item is located. In a further embodiment, the network server 110 can be configured to receive one or more requests from feed receivers for syndication of the content item.

Upon receiving the request from the feed receivers, the network server 110 can interact and communicate with the arbitration engine 112 in order to process such requests. In one embodiment, the arbitration engine 112 can communicate with the search engine 108 in order to identify and locate the content item or metadata associated therewith in the content database 116.

Furthermore, the arbitration engine 112 can also interact with a search engine 108 in order to search for rules in the rules database 118. In one example, a search query for syndication rules can include the content item to be syndicated such that the syndication rule obtained from the search is a syndication rule relevant to the content item. In another example, a search query for syndication rules can include a group of content items to be syndicated such that the syndication rule obtained from the search is a syndication rule relevant to the group of content items.

The rule or rules obtained from the search can be utilized by the arbitration engine 112 to establish the manner in which the content item should be sent to the feed receiver, and to determine whether the content item should be sent to the feed receiver at all. In one example the arbitration engine 112 can utilize the feed receiver profiles stored at the feed receiver profiles database 114. For example, the arbitration 112 can determine the age of the requesting feed receiver by locating the demographic information of the feed receiver in the feed receiver's profile. In another example, the arbitration engine 112 can determine the location of the feed receiver by extracting such information from the feed receiver profile.

Therefore, the arbitration engine 112 can be configured to compare metadata associated with a content item and data in the feed receiver profile. Further, the arbitration engine 112 can be configured to make this comparison according to the rules associated with the content item. As will be discussed later, rules associated with the content item can establish whether the feed receiver is to be provided with the syndicated content item at all. In another example, the rules can be indicative of streaming speed of content syndication. In another example, the rules can be indicative of the quantity of the content item that is to be provided to the feed receiver (e.g., a portion, the entirety of the content item, etc.).

In one embodiment, if the feed provider had uploaded the content item to the arbitration service provider 120, the arbitration engine 112 can interact with the search engine 108 in order to retrieve content items from the content item database 116 and syndicate the content item to the feed receiver at the feed receiver computing device 122. In order to do this the arbitration engine 112 can further cooperate with a syndication module 106. The syndication module 106 can be configured with logic to syndicate one or more content items to feed receivers over the data network 104.

In another embodiment, if the feed provider had not uploaded the content item but instead provided a link or an address of the location where the content item resides in the network, the arbitration engine 112 can be configured to request the content item from the feed provider computing device 102. Thus, for example, upon receiving the request, the feed provider can download the content item or stream the content item to the network server 110. The syndication module 106 can further be configured to interact with the network server 110 to relay or retransmit the received syndication from the feed provider to the feed receiver. In another example, the syndication module 106 can be configured to perform the relaying of the syndicated data in real time. As such if, for example, the content item is a video file, the syndication module 106 can be configured to receive the streamed video file, and concurrently, or immediately, retransmit the video file to the feed receiver computing device 102 over the data network 104.

In one example, once the feed receiver requests a video feed, the arbitration service provider 120 queries the rules database 118 in order to determine syndication rules associated to the video feed. In one aspect, the rules could have been previously provided by the feed provider. If it is determined, according to the syndication rules, that the video feed can be provided to the feed receiver (e.g., the feed receiver has proper permissions), the video feed is downloaded by the arbitration service provider 120 from the feed provider. The video feed can then be buffered by the arbitration service provider 120 and sent to the requestor based on the download rate that is established by the associated syndication rules.

In another example, the syndication module 106 can be configured to perform the relaying of the syndicated data in non real-time.

The network server 110 can be configured to receive a redirection from the feed provider computing device 102 of a syndicated feed request from the feed receiver computing device 122. In other words, once the feed receiver computing device 102 submits a request for syndicated content to the feed provider at the feed provider computing device 102, the feed receiver computing device 122 can be configured to redirect the request to the arbitration service provider 120. The arbitration service provider 120 can receive the redirection at the network server 110. The redirection can include the URL request for the syndicated feed. The network server 110 can interact with the search engine 108 in order to determine whether there are rules stored at the rules database 118 associated with the requested URL. Likewise, the network server 110 can interact with the search engine 108 in order to determine whether there are content items stored at the content database 116 or content metadata related to the URL received in connection to the redirected request. If there are rules at the rules database 118, the arbitration engine 112 can be configured to determine whether the content item is to be provided to the feed receiver. In addition, the rules are indicative of the manner in which the content item is to be syndicated to the feed receiver. As previously mentioned, if the feed provider had not provided the content item and uploaded the content item to the arbitration service provider 120 the arbitration engine 112 can request the content item using the same URL initially provided by the feed provider and the redirection of the feed receiver's request.

In yet another embodiment, the request by the feed receiver can be sent directly to the arbitration service provider 120 and process according to the rules at the rules database 118, the feed receiver profiles database 114, and the content metadata stored at the content database 116.

While various databases have described herein, one skilled in the art can recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art can recognize that each of the aforementioned modules can be combined into one or more modules, and be located either locally or remotely. Each of these modules can exist as a component of a computer program or process, or be standalone computer programs or processes recorded in a data repository.

Figure 2:
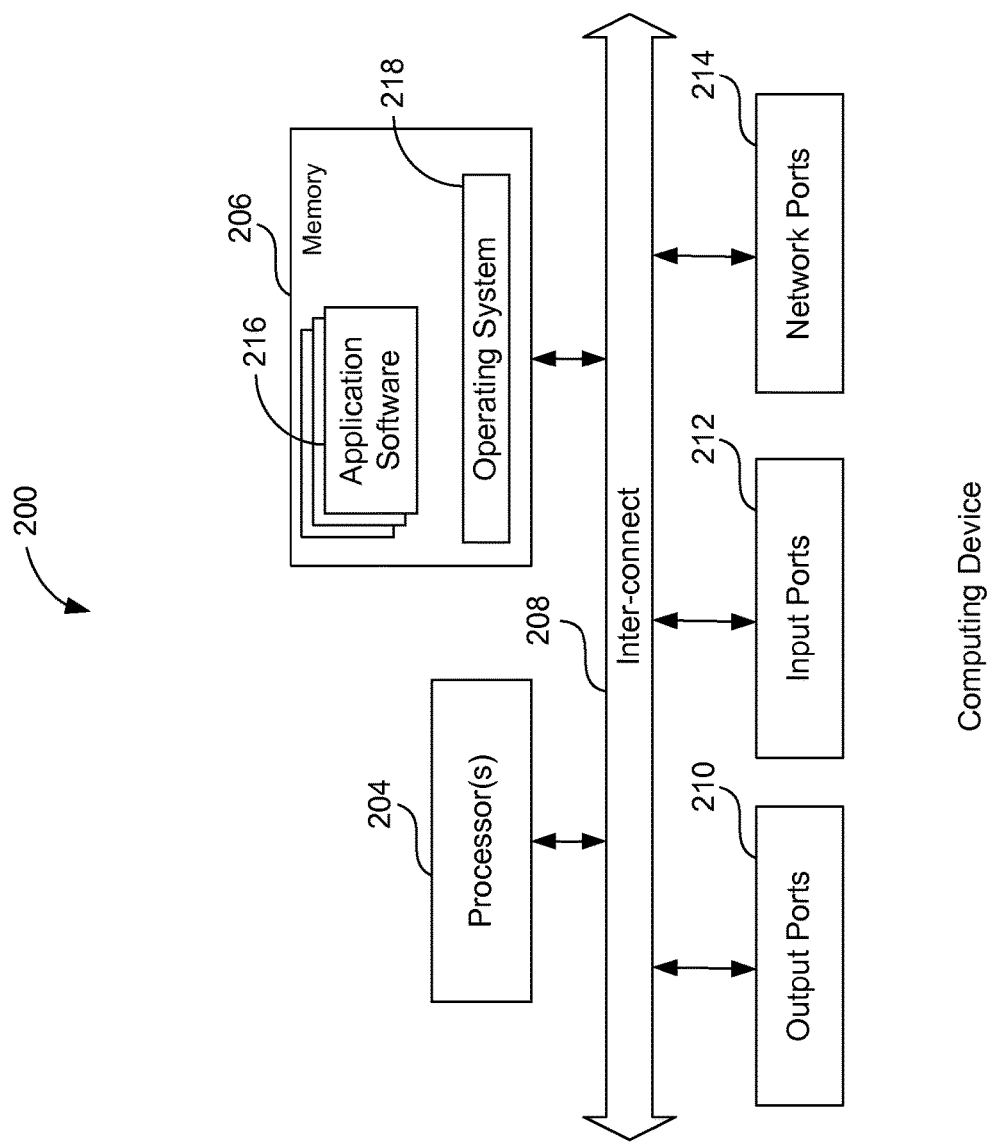
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, and receive and transmit digital signals, as required by the jobseeker computing device 102. In another example, the computing device 200 can be utilized to process calculations, execute instructions, receive and transmit digital signals, and receive and transmit search queries, job listings, and hypertext, as required by the search engine 108, the network server 110, the arbitration engine 112, and the syndication module 106.

The computing device 200 can be any general or special purpose computer now known or to become known capable of performing the steps and/or performing the functions described herein, either in software, hardware, firmware, or a combination thereof.

The computing device 200 includes an interconnect 208 (e.g., bus and system core logic), which interconnects microprocessor(s) 204 and memory 206. The interconnect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output ports 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 may include ROM (Read Only Memory), and volatile RAM (Random Access Memory) and non-volatile memory, such as a hard drive, flash memory, etc. Volatile RAM is typically implemented as dynamic RAM (DRAM), which requires continuous power in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

Figure 3:
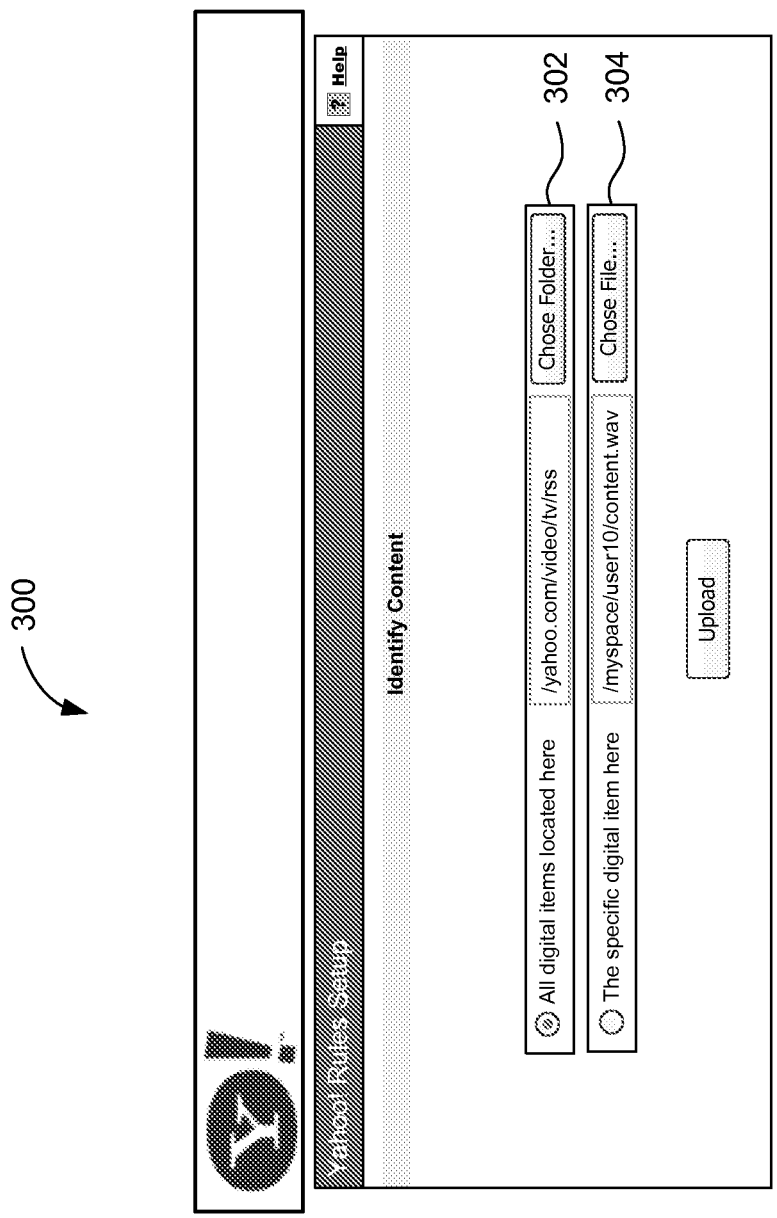
FIG. 3 depicts an exemplary user interface for identifying syndication feed content items according to one embodiment.

FIG. 3 depicts an exemplary user interface for identifying syndication feed content items according to one embodiment. User interface 300 includes a user interface mechanism 302 where a feed provider can indicate a folder or an Internet address or any other network address where content items may be located. In one example, the feed provider can choose a folder on a network address. In another embodiment, a user interface mechanism 304 can be provided in order to allow a feed provider to upload a specific content item to the arbitration service provider 120. As previously mentioned, as content items are uploaded they can be stored by the arbitration service provider 120 at the content database 116. In another embodiment, other user interface mechanisms can be provided to allow the feed provider to enter metadata associated with content items that are to be syndicated. For example, a feed provider can submit a text file indicating metadata associated with a video file. In another example, the metadata can be embedded as part of the video file that is uploaded to the arbitration service provider 120.

Figure 4:
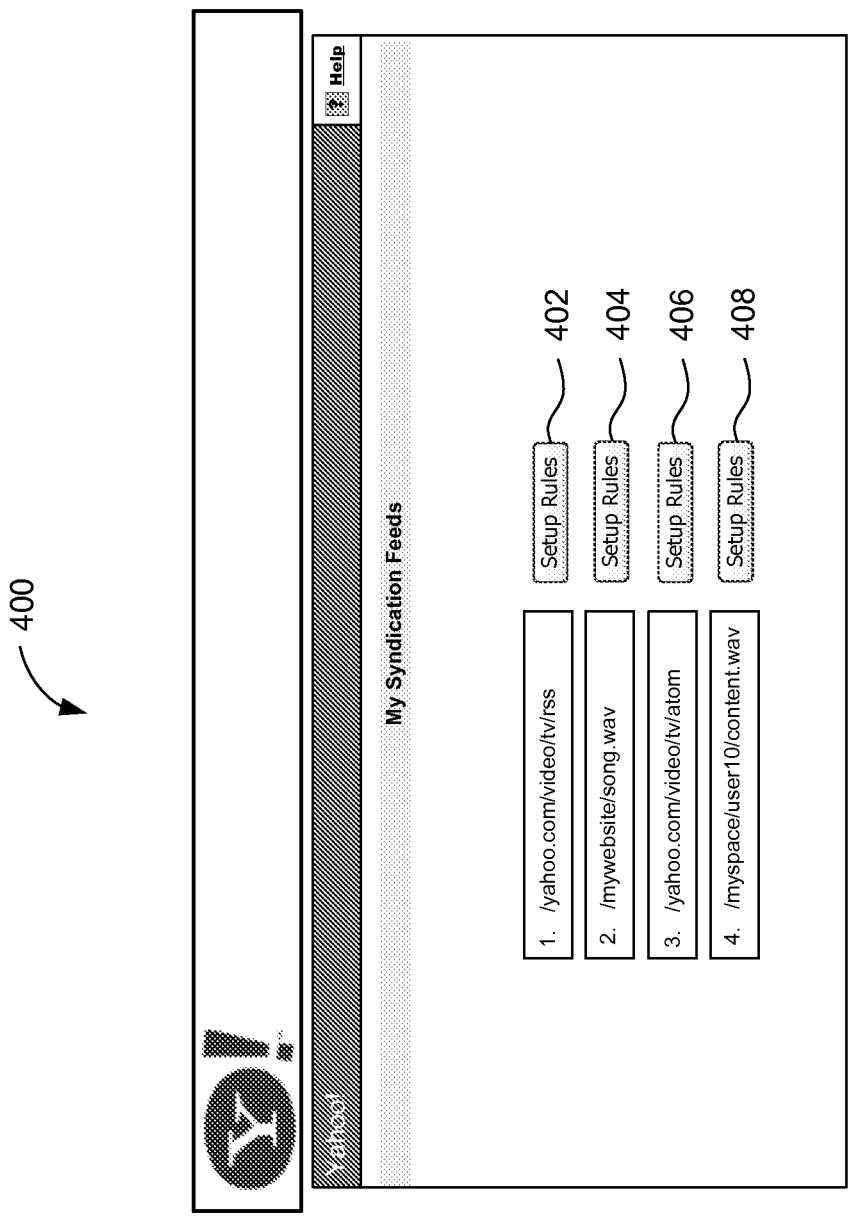
FIG. 4 depicts an exemplary user interface for viewing identified syndication feeds according to one embodiment.

FIG. 4 depicts an exemplary user interface for viewing identified syndication feeds according to one embodiment. User interface 400 lists identified syndication feeds for a particular feed provider. As such, a feed provider can be allowed to view a list of previously submitted URLs, content data and associated metadata. As such each of the syndication feeds provided by a feed provider can have an associated set of rules. In addition, the set of rules can apply to a group of content items that are to be syndicated or a single content item that is to be syndicated. For example, a feed provider may use a set up rules button 402 to establish rules for all content items that are received via the first RSS feed in the list of user interface 400. In another example, set up rules button 404 can be utilized to set up rules for syndication of the second item "song.wav" content item. Of course, various other examples are contemplated in order to permit a feed provider to establish rules of syndication for one or more content items.

Figure 5:
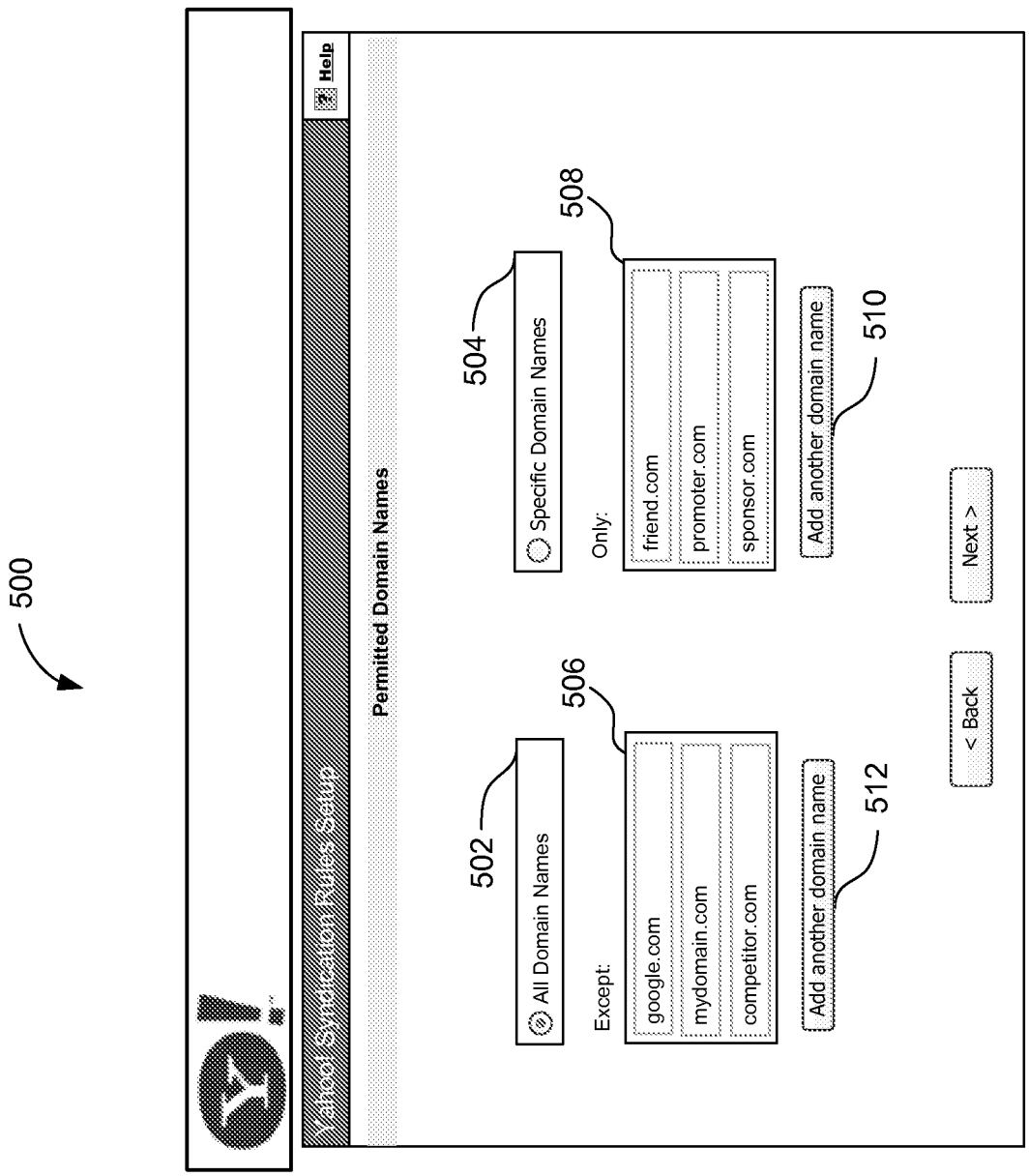
FIG. 5 depicts an exemplary user interface for setting up syndication rules indicative of permitted domain names according to one embodiment.

FIG. 5 depicts an exemplary user interface for setting up syndication rules indicative of permitted domain names according to one embodiment. User interface 500 permits the feed provider to establish domain names of feed receivers that are allowed to receive syndication feeds for a specific syndication feed or a group of syndication feeds. In one example, a feed provider can select radio button 502 to select that all domain names be allowed to receive the selected content item. The feed provider can also add exceptions in a list box 506 of domain names that are to be excluded from receiving the syndicated feed. Button 512 can be provided to add additional domain names to be excluded from the content item syndication.

Radio button 504 can be selected by the feed provider to indicate that only specified domain names can be allowed to receive the syndicated content item. For example, the feed provider can list in a list box 508 one or more domain names that are permitted to receive the syndication feed. Button 510 can be provided to add additional domain names to the list of list box 508.

Figure 6:
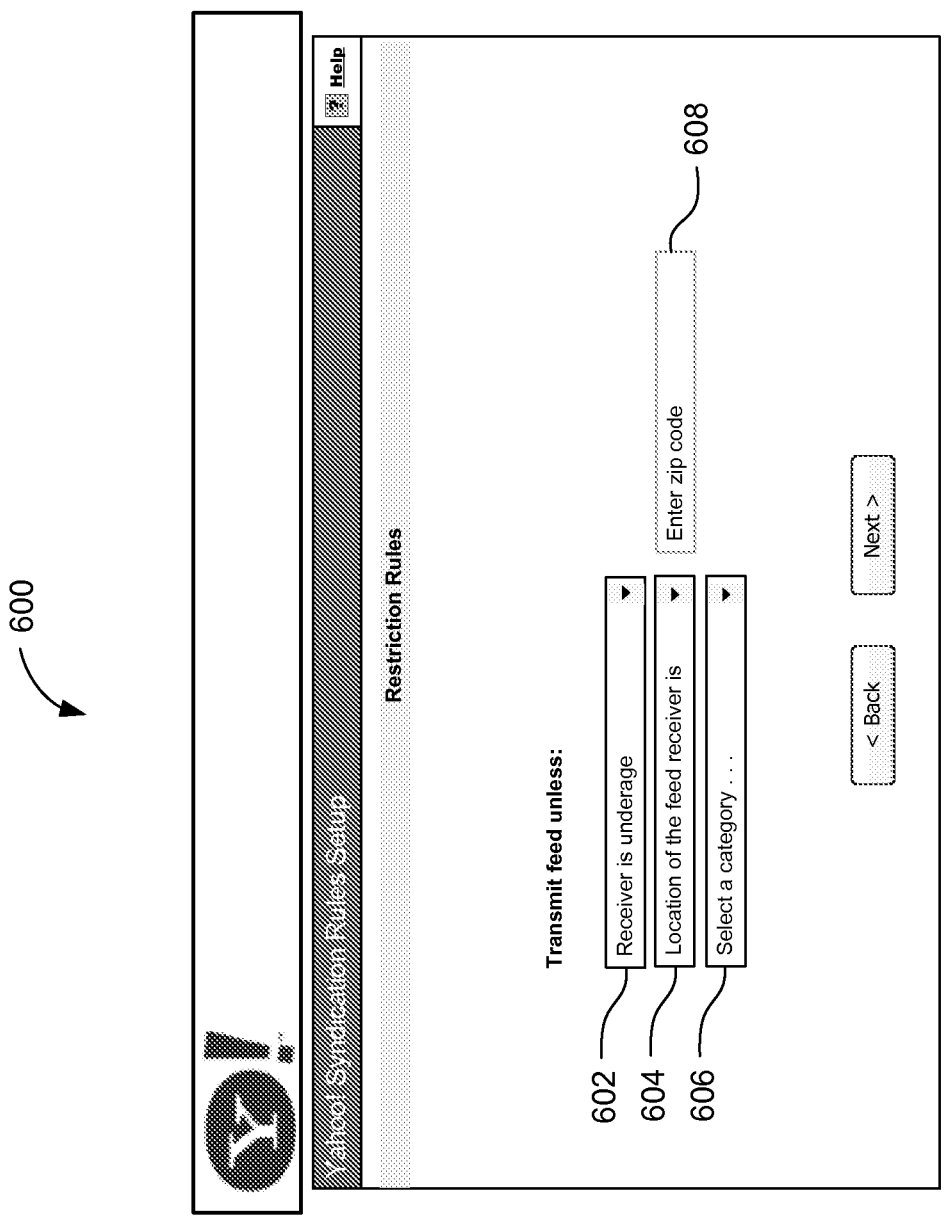
FIG. 6 depicts an exemplary user interface for setting up syndication rules indicative of restrictions according to one embodiment.

FIG. 6 depicts an exemplary user interface for setting up syndication rules indicative of restrictions according to one embodiment. Various other restrictions can be set up as part of the syndication rules provided by the feed provider. For example, a drop down menu 602 can be selected by the feed provider to indicate that if the feed receiver is underage the content item is not to be syndicated the feed receiver. Likewise, drop down menu 604 can be selected to indicate that if the feed receiver is not in a particular location then the feed receiver should not be syndicated the content item. As such, the feed provider can specify in a text box 608 the zip code that can be utilized to compare to, for example, a feed receiver profile and determine whether the feed receiver's zip code matches the required zip code in text box 608. A feed provider can utilize this option, for example, to feed more relevant data to feed receivers according to their location. Additional drop down menus 606 can be provided to further include other restriction rules that would modify the manner in which content items are syndicated to the feed receiver.

Figure 7:
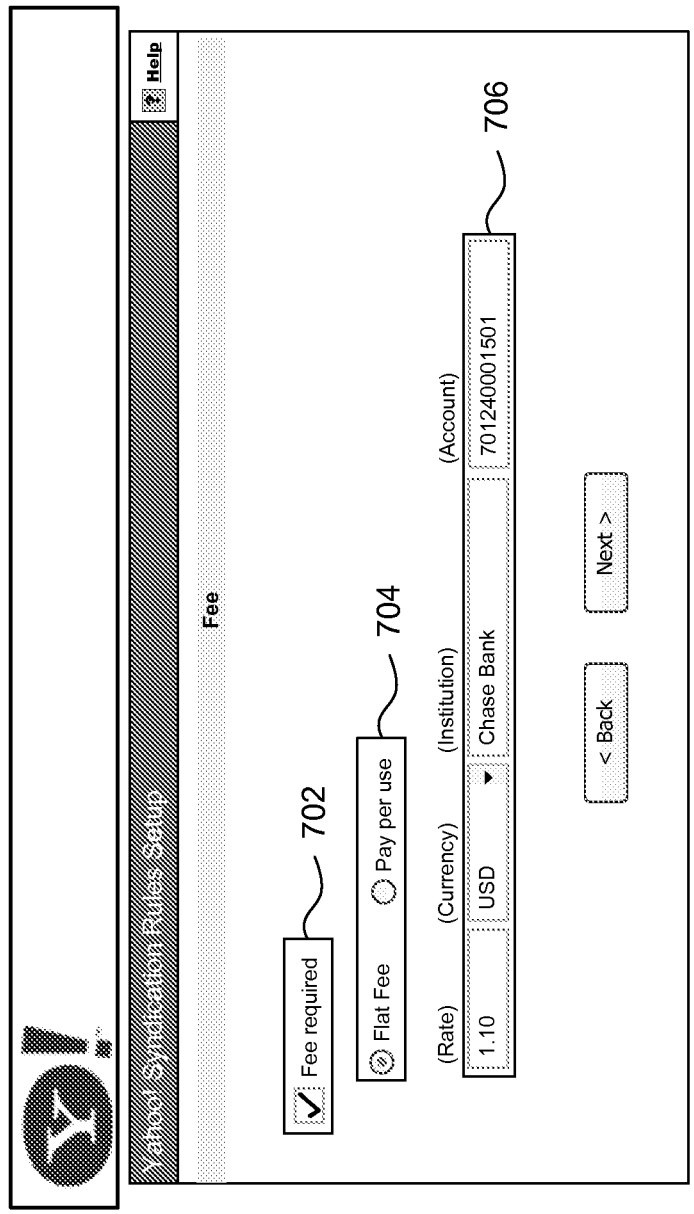
FIG. 7 depicts an exemplary user interface for setting up syndication rules indicative of fee requirements according to one embodiment.

FIG. 7 depicts an exemplary user interface for setting up syndication rules indicative of fee requirements according to one embodiment. In one example, the feed provider can indicate whether a fee is required when the feed receiver requests the content item. To that end, a check box 802 can be provided for the feed provider to check. Furthermore, the feed provider can also be provided with the radio button selection 804 that permits the feed provider to either select a flat fee or a pay-per-use scheme. Of course, a flat fee would allow a feed receiver to pay a one-time fee and receive multiple content item as many times as the feed receiver would like to. A pay-per-use scheme would require that the feed receiver make a payment every time a feed receiver used the content item. Furthermore, a user interface 806 can be provided to the feed provider in order to enter financial institution information as well as rates. As such, a rate field, currency field, institution name field and account number field can be provided as part of the user interface 806.

Figure 8:
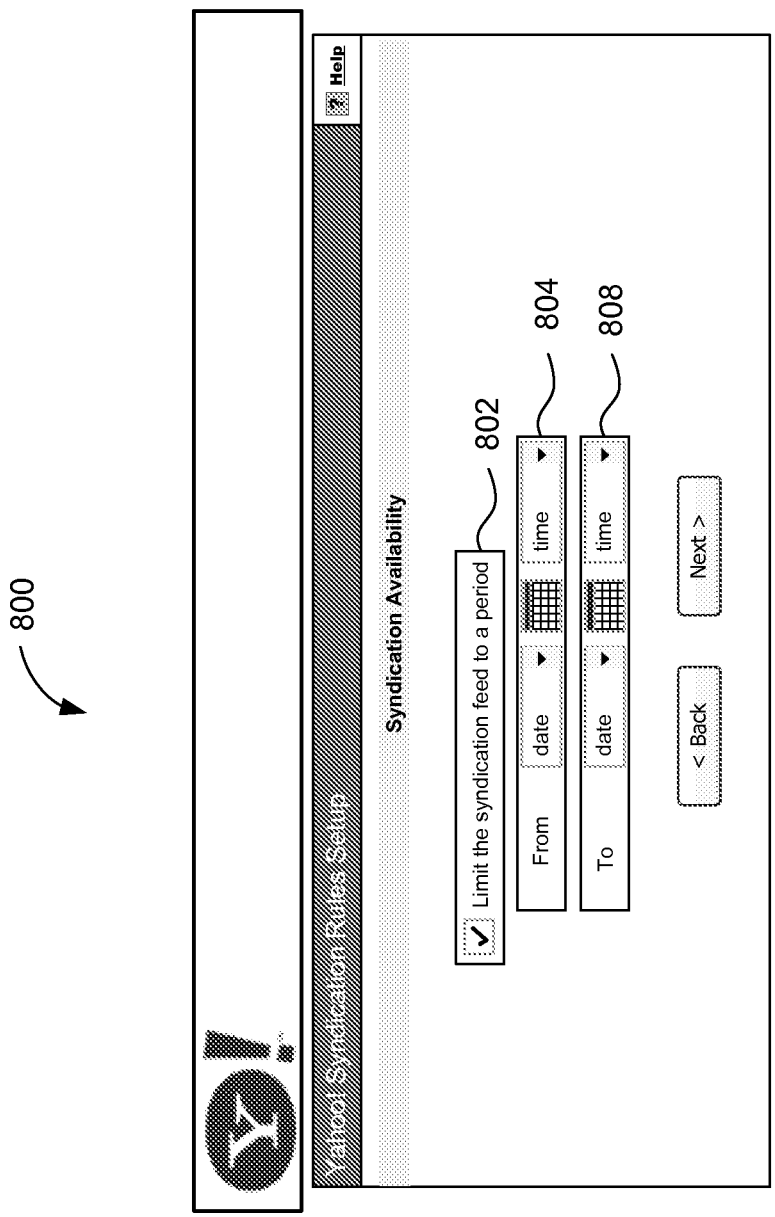
FIG. 8 depicts an exemplary user interface for setting up syndication rules indicative of syndication availability according to one embodiment.

FIG. 8 depicts an exemplary user interface for setting up syndication rules indicative of syndication availability according to one embodiment. The user interface 800 permits entering a period of time in which a content item is available for syndication. The user interface 800 can be provided for a feed provider who wishes to limit the distribution of a content item based on a specific time period. As such, the feed provider may utilize checkbox 802 to indicate that a feed provider wants to limit the syndication of the content item for a specific period of time. If a feed receiver requests a content item during a period in which the content item is unavailable, then the arbitration service provider 120 would not syndicate the content item to the feed receiver, even if the arbitration service provider 120 has the content item available (e.g., stored in a database). For example, user interface 804 includes a check box, a date field and time drop-down menus that can permit a feed provider to indicate a time and a date in which the availability of the syndication period can start. In addition, a user interface 808 can include a checkbox to indicate that there is an ending period as well as a text box for entering the date and drop down menus for entering a time. As can be appreciated by one skilled in the art, a feed provider may choose not to limit the availability of a content item to a specific period. In another example, the feed provider may choose to limit the availability to a specific period of time that starts at a selected date and time and ends at a selected date and time. In another example, the feed provider may select to start the availability at a selected time and date, and may further choose not to have an ending date for the availability period. In another example, the feed provider may simply choose an ending date, in which case the starting date would be the date in which the feed provider completes the submission of the content item and rules.

Figure 9:
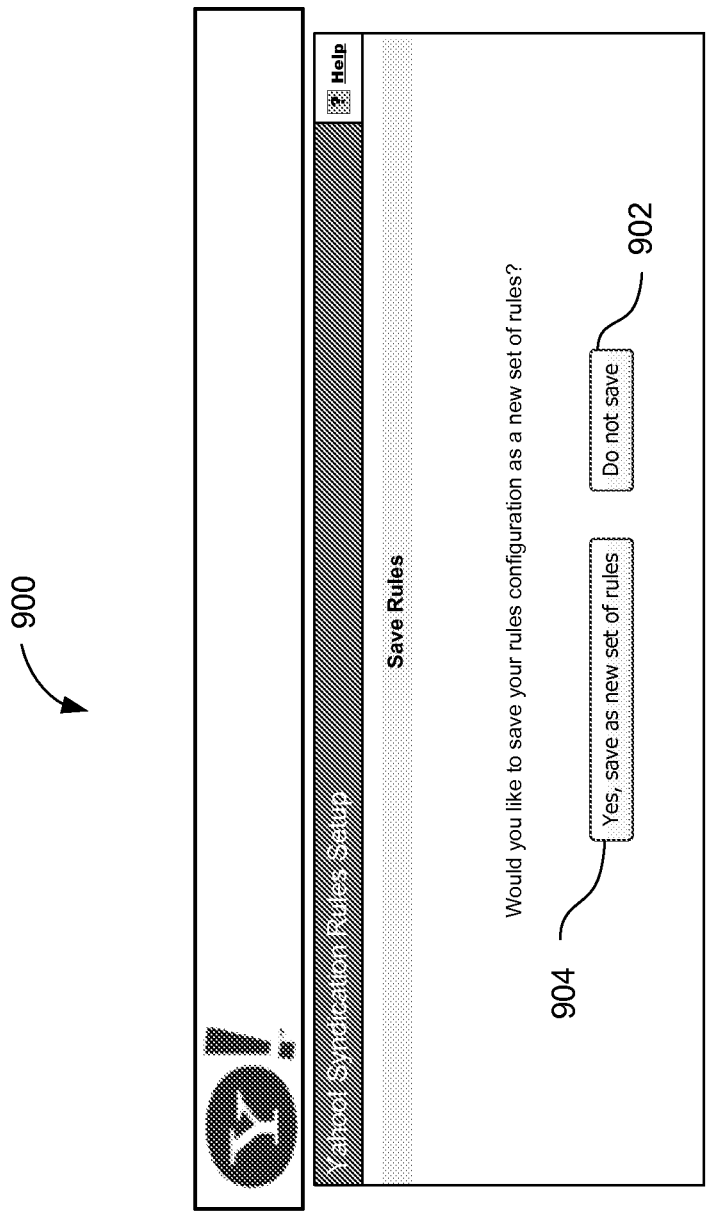
FIG. 9 depicts an exemplary user interface for saving syndication rules for future use according to one embodiment.

FIG. 9 depicts an exemplary user interface for saving syndication rules for future use according to one embodiment. Thus, user interface 900 can be utilized for selecting whether a rules configuration is to be saved according to one embodiment. User interface 900 can be provided to the feed provider to inquire whether or not the rules configuration recently entered by the feed provider should be saved for later use. A cancel button 902 can be provided for the feed provider in order to permit the feed provider to select that the rules configuration not be saved. In addition, save button 904 can be provided to the feed provider in order to permit the feed provider to select that the rules configuration be saved as a new set of rules. The set of rules can include rules delineating coverage of, for example, fee information and period of availability, feed receivers that may receive the content item, or any other pre-established rule configuration associated to the content item. As such, once the feed provider saves the set of rules, the saved set of rules can be accessible to the feed provider so that feed provider can apply the saved set of rules to other or new content items.

Figure 10:
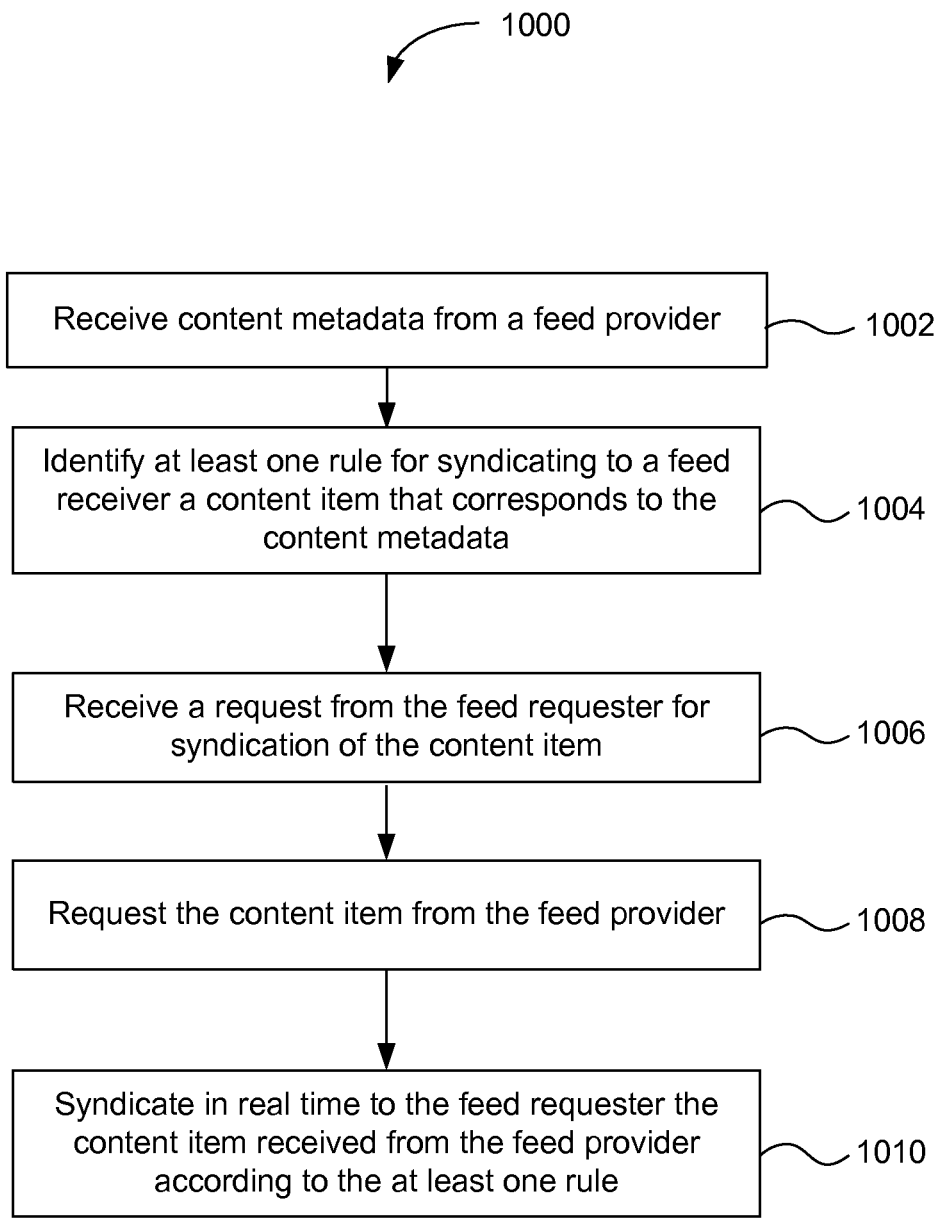
FIG. 10 depicts a flow diagram of a process for syndicating content according to one embodiment.

FIG. 10 depicts a flow diagram of a process for syndicating content according to one embodiment. At process block 1002, content metadata is received from a feed provider. Metadata can be received in one or more ways. For example, the metadata can be received via a web form provided by the arbitration service provider 120. The feed provider can then enter the metadata in the form and submit the form to the arbitration service provider 120. Process 1000 continues at process block 1004.

At process block 1004, at least one rule for syndicating to a feed receiver a content item that corresponds to the content metadata is identified. The rule can be identified by receiving the rule from a feed receiver. In another example, the rule is identified by retrieving a rule from a rules database 118. In another example, the rule is identified by establishing rules depending on the type of content item to be syndicated. Thus, an arbitration service provider 120 can inspect the type of content to be syndicated, and according to categorizations, ratings, etc., establish rules for syndication of the content. In one example, the arbitration service 120 can rate video content based on appropriateness for age of the feed receiver. In another example, the arbitration service 120, can establish rules for delivery of job listings to feed receivers residing at specific geographical areas. Process 1000 continues at process block 1006.

At process block 1006, a request from the feed receiver is received for syndication of the content item. The request can be received directly or indirectly. For example, the request can be first received by a feed provider, and redirected to the arbitration service provider 120. In addition, the request can be received via methods known in the art. For example, receiving an email address of the feed receiver, receiving an RSS or ATOM request at a website of the feed provider, etc. Process 1000 continues at process block 1008. At process block 1008, the content item is requested from the feed provider. Thus, once the arbitration service 120 receives the request from the feed receiver, the arbitration service 120 can request the content item from the feed provider. This is of course necessary if the arbitration service provider 120 does not already have the content item. Process 1000 continues at process block 1010. At process block 1010 the content item received from the feed provider is syndicated to the feed requestor according to the at least one rule. In one aspect, the content item can be syndicated in real-time. Therefore, as the content item is streamed, downloaded, or otherwise received by the arbitration service provider 120, the arbitration service provider 120 can simultaneously start syndicating the content item to the feed receiver. The syndication can be modified based on the rules pertaining to the content item being syndicated.

Figure 11:
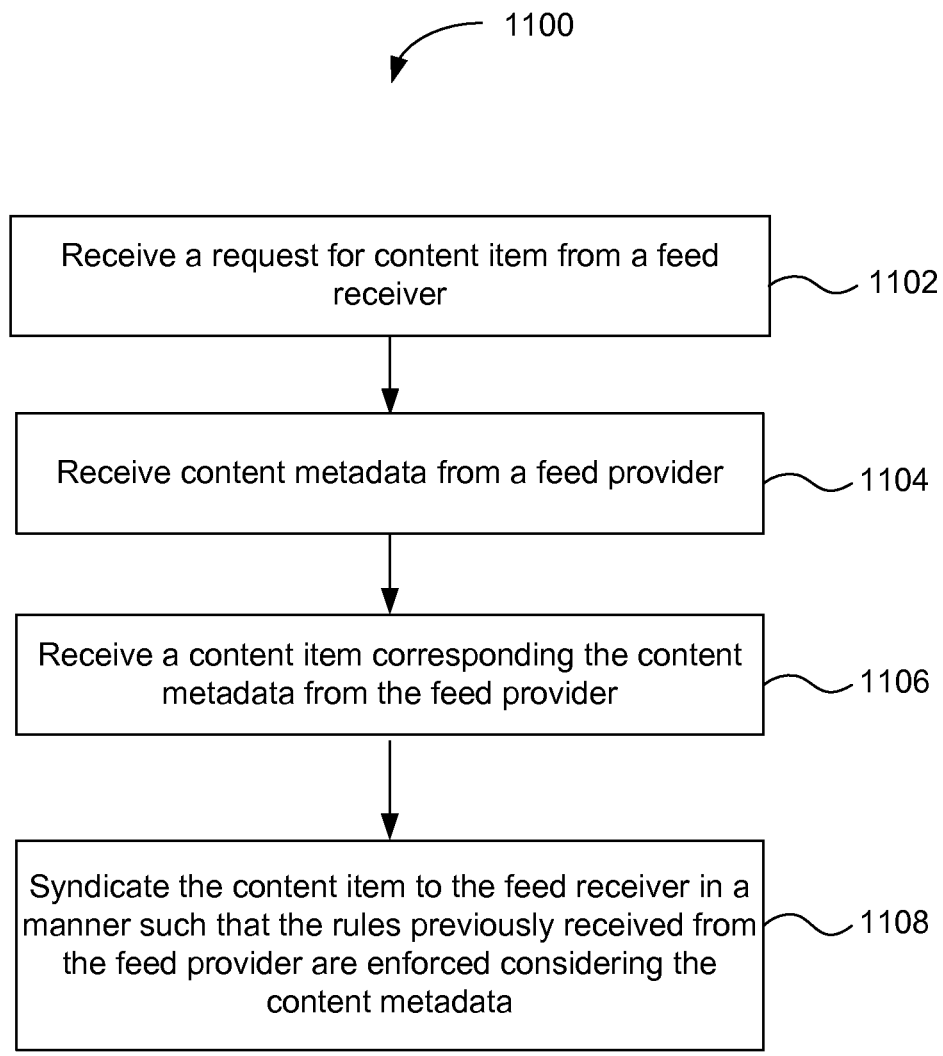
FIG. 11 depicts a flow diagram of a process for syndicating content according to another embodiment.

FIG. 11 depicts a flow diagram of a process for syndicating content according to another embodiment. At process block 1102 a request for a content item from a feed receiver is received. Process 1100 continues at process block 1104. At process block 1104 content metadata is received from a feed provider. Process 1100 continues at process block 1106. At process block 1106, a content item corresponding to the content metadata is received from the feed provider. Process 1100 continues at process block 1108. At process block 1108, the content is syndicated to the feed receiver in a manner such that the rules previously received from the feed provider are enforced considering the content metadata.

Figure 12:
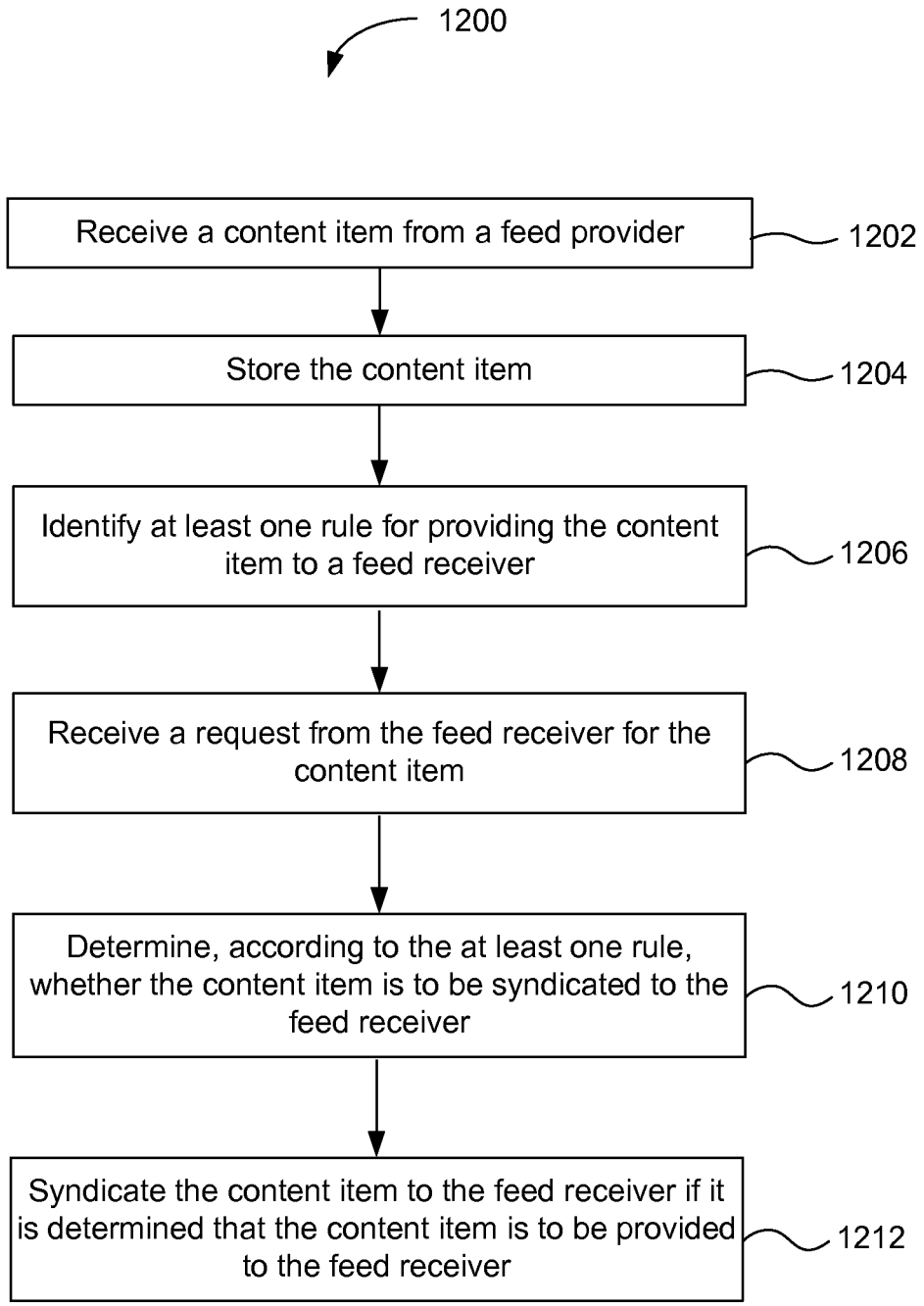
FIG. 12 depicts a flow diagram of a process for syndicating content according to yet another embodiment.

FIG. 12 depicts a flow diagram of a process for syndicating content according to yet another embodiment. At process block 1202, a content item is received from a feed provider. Process 1200 continues at process block 1204. At process block 1204, the content item is stored. Process 1200 continues at process block 1206. At process block 1206, at least one rule for providing the content item to a feed receiver is identified. Process 1200 continues at process block 1208. At process block 1208, a request from the feed receiver for the content item is received. Process 1200 continues at process block 1210. At process block 1210, it is determined whether the content item is to be syndicated to the feed receiver according to the at least one rule. Process 1200 continues at process block 1212. At process block 1212, the content item is syndicated to the feed receiver if it is determined that the content item is to be provided to the feed receiver.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:
receiving, by a computing device associated with an arbitration service, content metadata from a feed provider over a network;
identifying, by the arbitration service computing device, at least one rule for syndicating a content item to a feed receiver, said at least one rule set by the arbitration service and corresponding to the content metadata and comprising i) information indicating a streaming speed of syndication, ii) information indicating a quantity of the content item that is to be syndicated, and iii) information indicating a time period when the content item is available for syndication, said quantity comprising at most a portion of the content item and not the entire content item;
identifying, via the arbitration service computing device, at least one content item rule, said at least one content item rule comprising information controlling communication of the content item over said network by the feed provider;
receiving, over the network by the arbitration service computing device, a request from the feed receiver for syndication of the content item;
analyzing, via the arbitration service computing device, upon receiving said request, said at least one content item rule, and based on said analysis, determining, from said information controlling communication of the content item, that the content item is permitted to be provided to the feed receiver;
comparing, by the arbitration service computing device, the content metadata with data in a user profile of the feed receiver, said comparison based on the at least one content item rule and the at least one rule for syndication;
determining, by the arbitration service computing device, that said content item is to be communicated to the feed receiver based on said comparison, said determination performed by said arbitration service;
receiving, over the network, the content item from the feed provider based on said determination; and
syndicating, via the arbitration service computing device, the content item received from the feed provider to the feed receiver according to the at least one rule for syndication, said syndication only being available during said time period, said syndication causing said quantity of the content item to be sent to the feed receiver at said streaming speed.

2. The method of claim 1, wherein the at least one rule for syndication is identified upon receiving from the feed provider the at least one rule for syndicating the content item.

3. The method of claim 1, wherein the at least one rule for syndication is identified by an arbitration service that establishes the at least one rule.

4. The method of claim 1, wherein the at least one rule for syndication is indicative of whether the feed receiver is permitted to receive the content item.

5. A computing device associated with an arbitration service comprising:
a processor; and
a non-transitory computer-readable storage medium for tangibly storing thereon program logic for execution by the processor, the program logic comprising:
logic executed by the processor for receiving content metadata from a feed provider over a network;
logic executed by the processor for identifying at least one rule for syndicating a content item to a feed receiver, said at least one rule set by the arbitration service and corresponding to the content metadata and comprising i) information indicating a streaming speed of syndication, ii) information indicating a quantity of the content item that is to be syndicated, and iii) information indicating a time period when the content item is available for syndication, said quantity comprising at most a portion of the content item and not the entire content item;
logic executed by the processor for identifying at least one content item rule, said at least one content item rule comprising information controlling communication of the content item over said network by the feed provider;
logic executed by the processor for receiving a request from the feed receiver for syndication of the content item;
logic executed by the processor for analyzing upon receiving said request, said at least one content item rule, and based on said analysis, determining, from said information controlling communication of the content item, that the content item is permitted to be provided to the feed receiver;
logic executed by the processor for comparing the content metadata with data in a user profile of the feed receiver, said comparison based on the at least one content item rule and the at least one rule for syndication;

logic executed by the processor for determining that said content item is to be communicated to the feed receiver based on said comparison, said determination performed by said arbitration service;

logic executed by the processor for receiving the content item from the feed provider based on said determination; and logic executed by the processor for syndicating the content item received from the feed provider to the feed receiver according to the at least one rule for syndication, said syndication only being available during said time period, said syndication causing said quantity of the content item to be sent to the feed receiver at said streaming speed.

* * * * *